United States Patent
Lee et al.

(10) Patent No.: US 8,139,906 B2
(45) Date of Patent: Mar. 20, 2012

(54) OPTICAL WIRING MODULE

(75) Inventors: Myung Hyun Lee, Daejeon (KR); Jung Jin Ju, Daejeon (KR); Sun Tak Park, Daejeon (KR); Jin Tae Kim, Daejeon (KR); Min Su Kim, Daejeon (KR); Seung Koo Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 268 days.

(21) Appl. No.: 12/375,608

(22) PCT Filed: Sep. 17, 2007

(86) PCT No.: PCT/KR2007/004471
§ 371 (c)(1),
(2), (4) Date: Jan. 29, 2009

(87) PCT Pub. No.: WO2008/038921
PCT Pub. Date: Apr. 3, 2008

(65) Prior Publication Data
US 2009/0304325 A1    Dec. 10, 2009

(30) Foreign Application Priority Data
Sep. 29, 2006    (KR) .................. 10-2006-0095466

(51) Int. Cl.
*G02B 6/12* (2006.01)
*G02B 6/10* (2006.01)
(52) U.S. Cl. .................. 385/14; 385/31; 385/130
(58) Field of Classification Search .......... 385/14, 385/31, 129, 130
See application file for complete search history.

(56) References Cited

U.S. PATENT DOCUMENTS

| | | | |
|---|---|---|---|
| 6,285,808 B1 | 9/2001 | Mehlhorn et al. | |
| 6,442,321 B1 | 8/2002 | Berini | |
| 6,671,438 B2 | 12/2003 | Ido et al. | |
| 6,885,788 B2 | 4/2005 | Iwaki et al. | |
| 7,420,682 B2* | 9/2008 | Salamon et al. | 356/445 |
| 7,483,140 B1* | 1/2009 | Cho et al. | 356/445 |
| 7,715,667 B2* | 5/2010 | Lee et al. | 385/14 |
| 2005/0265403 A1* | 12/2005 | Anderson et al. | 372/20 |
| 2006/0045418 A1 | 3/2006 | Cho et al. | |
| 2006/0067608 A1* | 3/2006 | Kobayashi et al. | 385/14 |

FOREIGN PATENT DOCUMENTS

JP    64-055889 U    3/1989

(Continued)

OTHER PUBLICATIONS

Geert Van Steenberge et al., "MT-Compatible Laser-Ablated Interconnections for Optical Printed Circuit Boards", Journal of Lightwave Technology, vol. 22, No. 9, pp. 2083-2090.

(Continued)

*Primary Examiner* — Uyen Chau N Le
*Assistant Examiner* — Michael Mooney
(74) *Attorney, Agent, or Firm* — Rabin & Berdo, P.C.

(57) ABSTRACT

Provided is an optical wiring module. The optical wiring module includes a light source mounted on a surface of a substrate, a metal optical waveguide coupled to a transverse magnetic mode of light emitted from the light source and using a long-range surface palsmon polariton, and a photodetector. The optical wiring module has a simple structure enabling it to be further miniaturized and its yield to be increased.

11 Claims, 3 Drawing Sheets

FOREIGN PATENT DOCUMENTS

| | | |
|---|---|---|
| JP | 2000-022279 A | 1/2000 |
| JP | 2001-174655 A | 6/2001 |
| JP | 2002-139641 A | 5/2002 |
| JP | 2003-518647 A | 6/2003 |
| JP | 2003-215029 | 7/2003 |
| JP | 2004-020381 | 1/2004 |
| KR | 10-2004-0094580 | 11/2004 |
| WO | WO-01/48521 A1 | 7/2001 |

OTHER PUBLICATIONS

Sergey I. Bozhevolnyi, et al., "Integrated power monitor for long-range surface plasmon polaritons", Optics Communications 255 (2005) 51-56.

* cited by examiner

[Fig. 1]
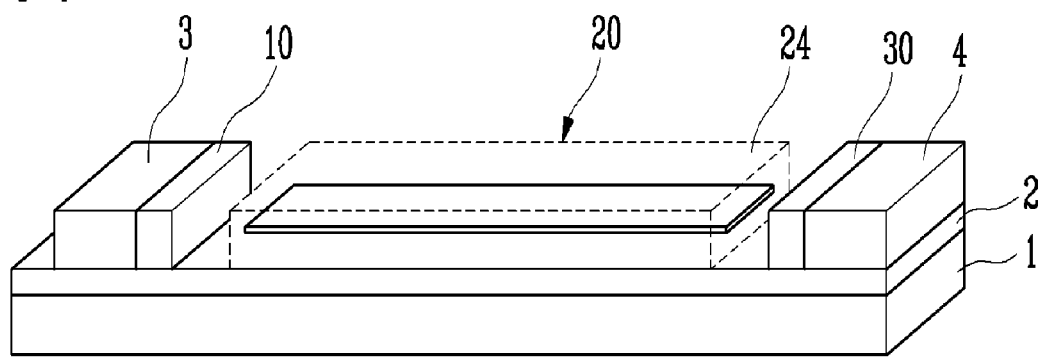
[Fig. 2]
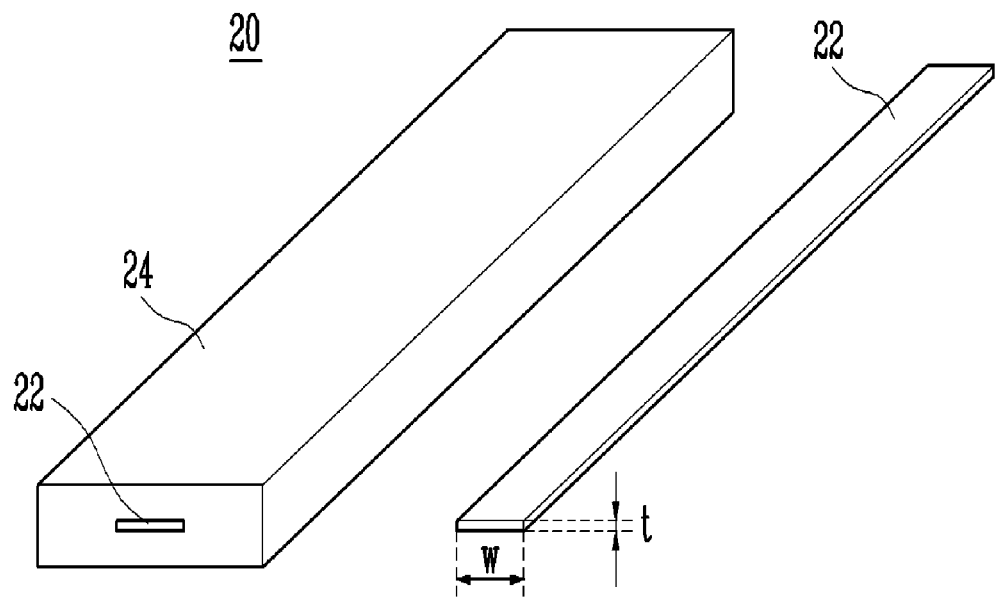

[Fig. 3]
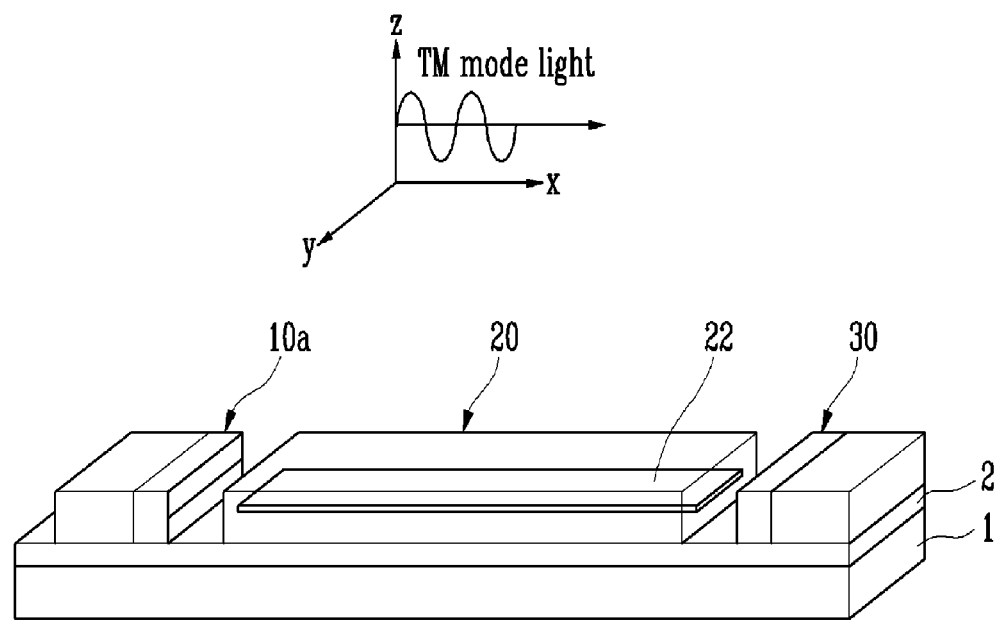
[Fig. 4]
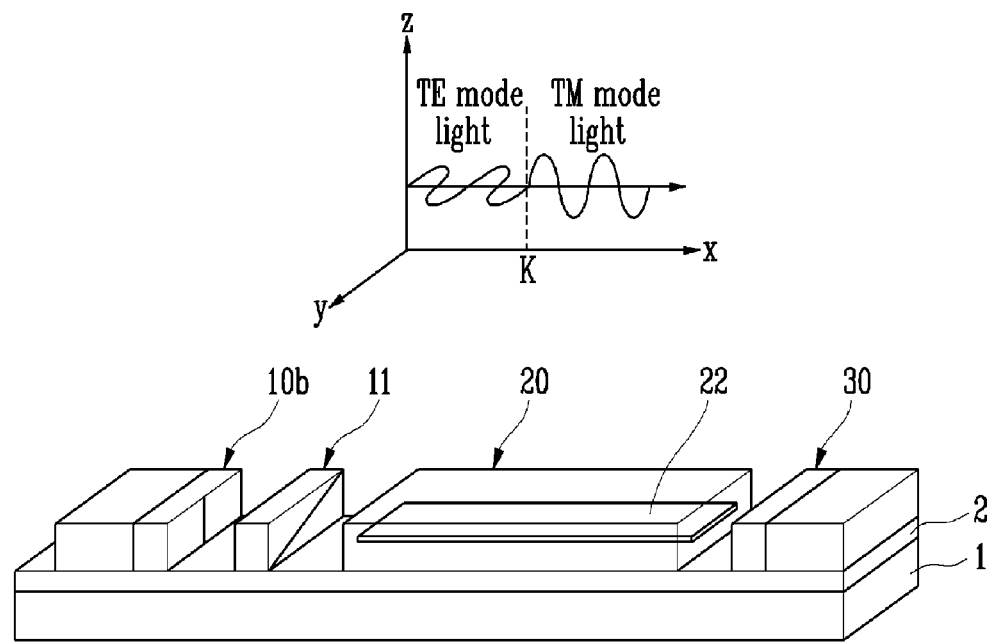

[Fig. 5]
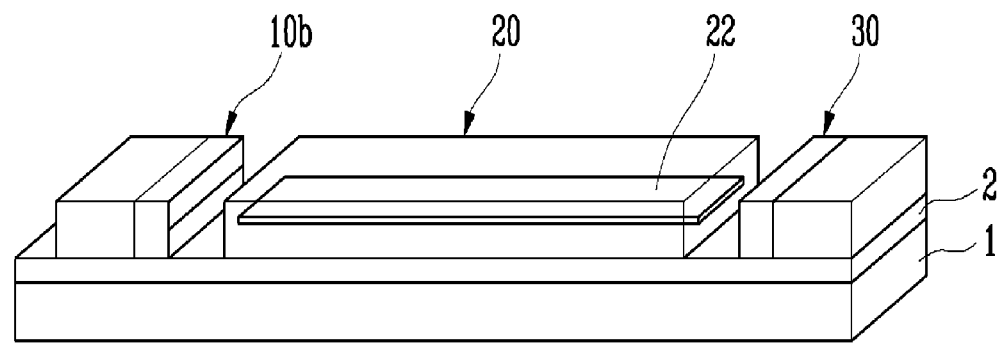
[Fig. 6]
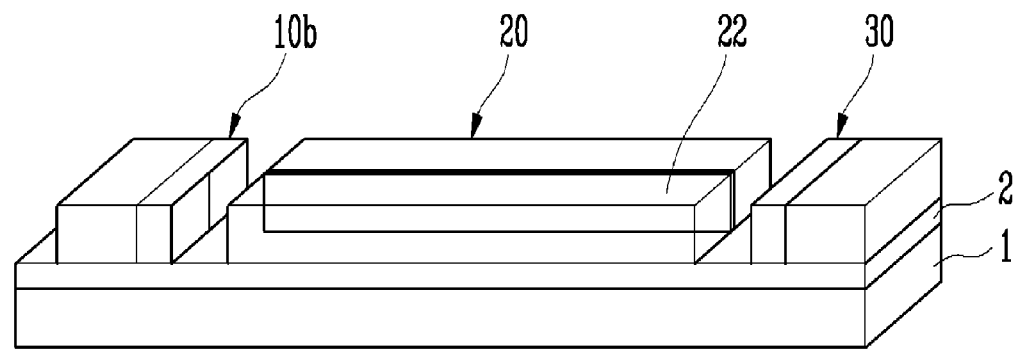
[Fig. 7]
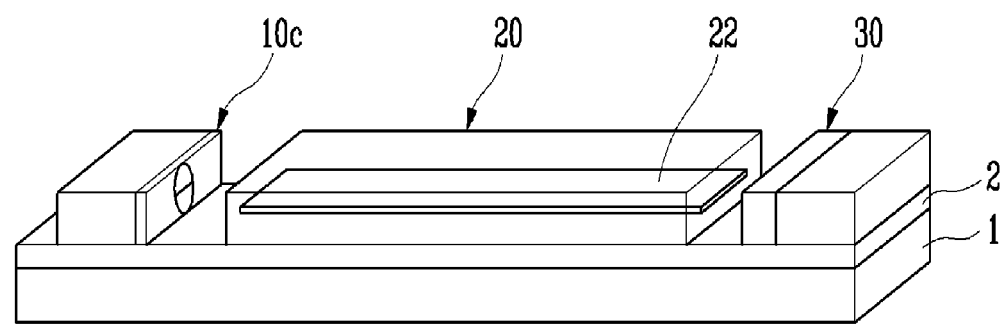

OPTICAL WIRING MODULE

TECHNICAL FIELD

The present invention relates to a novel optical wiring module capable of processing an ultra-high-speed and large-capacity optical signal using a metal optical waveguide employing a transverse magnetic (TM) mode light source and a long-range surface plasmon polariton (LR-SPP).

This work was supported by the IT R&D program of Ministry of Information and Communication/Institute for Information Technology Advancement [2006-S-073-01, Nano flexible opto-electic PCB module for portable display] in Korea.

BACKGROUND ART

When conventional electric wiring is replaced with optical wiring, in addition to an optical transmission medium, various components such as a laser diode (LD) for converting an electrical signal into an optical signal, a driver integrated circuit (IC), an optical waveguide for transmitting an optical signal, a photodiode (PD) for converting a detected optical signal back into an electrical signal, and a receiver integrated circuit (IC) are required. In recent years, a vertical-cavity surface-emitting laser (VCSEL) for emitting light through its surface has been widely used as the laser diode (LD). The vertical-cavity surface-emitting laser has the advantages that a two-dimensional array can be manufactured, a circular symmetrical beam cross-section can be obtained, and power consumption can be reduced. In addition, the vertical-cavity surface-emitting laser can inspect whether a device on a wafer operates properly before cutting a chip, and can make more devices per unit area to thereby reduce manufacturing costs. An optical fiber and a dielectric optical waveguide are widely used as the optical waveguide for transmitting an optical signal. A PIN photodiode (PD) is widely used as a photodetector. A Si-based circuit such as a Si CMOS or SiGe BiCMOS circuit is widely used as the driver IC and the receiver IC in order to reduce manufacturing costs.

In general, in order to transmit light through the optical wiring, the optical fiber or the dielectric optical waveguide is used. In the optical wiring integrated module, an optical signal is transmitted through an optical waveguide made of a dielectric material such as glass, silica, polymer, or the like. In addition, in order to obtain a compact and integrated module, a built-in optical waveguide is used in various optical printed circuit boards (PCBs). Though a multi-mode optical waveguide is mainly used to increase optical alignment efficiency and readily manufacture an optical PCB module, it is difficult to manufacture a relatively large built-in optical waveguide and thus its yield is quite low.

In addition, most optical PCBs used nowadays use the vertical-cavity surface-emitting laser. The vertical-cavity surface-emitting laser or the photodiode is mounted on the surface of a substrate. In this case, since the vertical-cavity surface-emitting laser or the photodiode vertically emits or receives light, in order to connect the light to the optical waveguide horizontally mounted on the optical PCB, a connector component for changing a light path by 90° is required. Different types of connector components, such as a 45° mirror formed at an end part of the optical waveguide and a 90° bent optical waveguide block, have been developed and are currently used. However, there is still no secure solution, and thus new technology needs to be developed.

DISCLOSURE OF INVENTION

Technical Problem

The present invention is directed to an optical wiring module capable of processing an ultra-high-speed and large-capacity optical signal using a metal optical waveguide employing a transverse magnetic (TM) mode light source chip and a long-range surface plasmon polariton (LR-SPP).

Technical Solution

One aspect of the present invention provides an optical wiring module including: a light source; and a metal optical waveguide coupled to a transverse magnetic mode of light emitted from the light source and using a long-range surface palsmon polariton.

In addition, the light source may include an edge-emitting light source chip mainly outputting the transverse magnetic mode.

The light source may include an edge-emitting light source chip mainly outputting a transverse electric mode, and a half-wave plate for converting the transverse electric mode light emitted from the edge-emitting light source chip into the transverse magnetic mode light to transmit the transverse magnetic mode light to the metal optical waveguide.

The light source may include the edge-emitting light source chip aligned to be rotated by 90° on a substrate and mainly outputting a transverse electric mode. In this case, the transverse electric mode light output from the light source chip mainly outputting the transverse electric mode is coupled to the metal optical waveguide in a transverse magnetic mode.

The light source may include the edge-emitting light source chip mainly outputting a transverse electric mode. At this time, the metal optical waveguide is installed such that a strip-shaped metal wire is disposed perpendicular to a flat surface of the substrate.

The light source may include the surface-emitting light source chip installed on the substrate by 90°.

ADVANTAGEOUS EFFECTS

As can be seen from the foregoing, an optical wiring module in accordance with the present invention is provided to process a high-speed and large-capacity optical signal. Therefore, it is possible to solve problems of the conventional optical wiring module, for example, process difficulties due to 90° incidence of the optical wiring module using a surface-emitting laser, active alignment, use of a bulky dielectric optical waveguide, and so on. In addition, it is possible to obtain a high-yield and compact optical wiring module.

BRIEF DESCRIPTION OF THE DRAWINGS

The above and other objects, features and advantages of the present invention will be more apparent from the following detailed description taken in conjunction with the accompanying drawings, in which:

FIG. 1 is a schematic view of an optical wiring module in accordance with the present invention;

FIG. 2 is a perspective view of a metal optical waveguide of FIG. 1;

FIG. 3 is a schematic view of an optical wiring module in accordance with a first exemplary embodiment of the present invention;

FIG. 4 is a schematic view of an optical wiring module in accordance with a second exemplary embodiment of the present invention;

FIG. 5 is a schematic view of an optical wiring module in accordance with a third exemplary embodiment of the present invention;

FIG. 6 is a schematic view of an optical wiring module in accordance with a fourth exemplary embodiment of the present invention; and FIG. 7 is a schematic view of an optical wiring module in accordance with a fifth exemplary embodiment of the present invention.

*DESCRIPTION OF MAJOR REFERENCE NUMERALS

10: Light source
20: Metal optical waveguide
30: Photodetector

MODE FOR THE INVENTION

Exemplary embodiments of the present invention will now be described in detail with reference to the accompanying drawings. The exemplary embodiments are described to facilitate sufficient understanding of the invention by those skilled in the art.

FIG. 1 is a schematic view of an optical wiring module in accordance with the present invention.

Referring to FIG. 1, the optical wiring module in accordance with the present invention includes a light source 10, a metal optical waveguide 20 using long-range surface plasmon polariton (LR-SPP), and a photodetector.

In this embodiment, a conventional optical fiber or a dielectric optical waveguide was replaced with the metal optical waveguide 20 using the long-range surface plasmon polariton (LR-SPP). A surface plasmon (SP) is a wave of charge density confined and progressing along an interface at which real number terms of a dielectric constant have opposite signs, and surface charge density oscillation forms a longitudinal surface-confined wave. In addition, when free electrons are excited by the electric field of incident light into coupled oscillation with the surface plasmon and progress therewith, the resulting evanescent wave is referred to as a surface plasmon polariton (SPP). For example, the surface plasmon polariton may be generated at an interface between a dielectric material such as silica, glass or the like and a thin metal layer formed in the dielectric material. However, since the surface plasmon polariton has an imaginary number of a wave vector in the evanescent mode, the surface plasmon polariton propagates to a predetermined distance and then is evanesced. In addition, since the surface plasmon polariton can be excited by introduced light to progress and re-emit light at another point, the surface plasmon polariton may be used in optical wave guiding. However, when a metal waveguide is used, an increase in an imaginary part of a dielectric constant of the metal increases adsorption in the metal to reduce the range of the surface plasmon polariton to a very short length, e.g., several to tens micrometers, thereby making it difficult to use the metal waveguide as an optical waveguide. For this reason, most surface plasmons or surface plasmon polaritons are applied to a photo sensor, and so on, using a very short distance. However, since the long-range surface plasmon polaritons (LR-SPP) independently progress at two interfaces between the metal and the dielectric material, the surface plasmon polaritons affect each other as reduction of the metal thickness t (see FIG. 2) reduces ohmic resistance loss of the metal and the metal thickness t becomes smaller than a penetration distance in the metal of the two modes. When the metal thickness t is smaller than the penetration distance in the metal of the two modes, the surface plasmon polaritons at each interface become coupled to form a super mode, which is referred to as a fano mode. Using the super mode, it is theoretically possible to transmit light over infinite distance. Though the super mode is classified into a symmetrical mode and an asymmetrical mode depending on the electric field distribution in the metal, a long-range transmission mode is the symmetrical mode. Generally, when the LR-SPP is excited by light, only the symmetrical mode is excited. In addition, since the LR-SPP and the SPP form a longitudinal surface-confined wave, an electric field component of an incident wave should have a component perpendicular to the interface. Therefore, only the transverse magnetic mode can excite the LR-SPP and the SPP.

The light source 10 is implemented as an optical transmission device for converting an electrical signal into an optical signal. The optical transmission device may include an edge-emitting light source chip such as a laser diode (LD), a surface-emitting light source chip, or the like. The light source 10 is electrically connected to the driver IC 3 mounted on the surface of the substrate 1.

The photodetector 30 is a device for re-converting the optical signal transmitted through the metal optical waveguide 20 into an electrical signal, and uses a photodiode (PD), and so on. The photodetector 30 is electrically connected to the receiver IC 4 mounted on the surface of the substrate 1.

The light source 10, the metal optical waveguide 20, the photodetector 30, the driver IC 3, and the receiver IC 4 can be separately installed on the substrate 1, on which an insulating layer 2 is applied. The insulating layer 2 may be omitted, and if necessary, the substrate 1 and the insulating layer 2 may be omitted together. The substrate 1 may be a flexible polymer substrate or some other material, rather than the solid substrate. In addition, a dielectric material layer 24 of the metal optical waveguide 20 may be formed of a polymer, and the substrate 1 and the insulating layer 2 may also be formed of a polymer. Otherwise, a flexible optical wiring plate may be manufactured.

FIG. 2 is a perspective view of a metal optical waveguide using the LR-SPP of FIG. 1.

Referring to FIG. 2, the metal optical waveguide 20 includes photoelectric transmission LR-SPP waveguide metal wire 22, and a dielectric material layer 24 in contact with the LR-SPP waveguide metal wire 22.

The LR-SPP waveguide metal wire 22 may have a thickness of 5-200 nm and a width of 0.5-100 μm in order to transmit an optical signal using the LR-SPP. Therefore, the LR-SPP waveguide metal wire 22 has the shape of a strip with a substantially rectangular cross-section.

In addition, the LR-SPP waveguide metal wire 22 may include a noble metal, i.e., an element from the 1B-family, or an alloy thereof. The noble metal family elements include copper (Co), silver (Ag), gold (Au), and alloys thereof, have good electrical conductivity, and can readily induce generation of the long-range surface plasmon polariton. In the case of silver (Ag) wire, an absorption coefficient of the dielectric constant is low which reduces transmission loss, but the silver wire is likely to be discolored when its surface is exposed. In order to prevent discoloration of the silver wire, a thin gold layer having more stable surface characteristics than the silver wire is deposited on an upper surface of the silver wire to form a silver-gold deposited alloy metal wire, or the thin gold layer is deposited on both surfaces of the silver wire to form a symmetrical gold-silver-gold deposited alloy metal wire.

The dielectric material layer 24 includes a low-loss polymer. The low-loss polymer, i.e., a low-loss optical polymer, generally means a polymer including a halogen element such as fluorine and so on, or deuterium, for example, fluorinated poly arylene ether (FPAE).

FIG. 3 is a schematic view of an optical wiring module in accordance with a first exemplary embodiment of the present invention.

Referring to FIG. 3, the optical wiring module in accordance with a first exemplary embodiment of the present invention includes a light source 10a, a metal optical waveguide 20 using LR-SPP, and a photodetector 30. The light source 10a, the metal optical waveguide 20, and the photodetector 30 are mounted on the surface of a substrate 1. The light source 10a, which mainly outputs a transverse magnetic (TM) mode, includes an edge-emitting light source chip, and TM mode light emitted from the edge-emitting light source chip is directly coupled to the metal optical waveguide 20 to be transmitted.

In the optical wiring module of this embodiment, in order to compete with an optical wiring module using the LR-SPP metal optical waveguide 20, the light source 10a mainly outputting a TM mode is used. A transverse electric (TE) mode rather than the TM mode is mainly output by a currently used light source, i.e., a laser diode (LD), as the edge-emitting light source chip. Therefore, in this embodiment, tensile stress is generated during an epitaxial growth process, and a light hole has a lower energy than a heavy hole, thereby manufacturing the LD mainly outputting the TM mode.

FIG. 4 is a schematic view of an optical wiring module in accordance with a second exemplary embodiment of the present invention.

Referring to FIG. 4, the optical wiring module in accordance with a second exemplary embodiment of the present invention includes a light source 10b that mainly outputs a TE mode, a half-wave delay, i.e., a half-wave plate 11, a metal optical waveguide 20 using LR-SPP, and a photodetector 30. The light source 10b, the half-wave plate 11, the metal optical waveguide 20, and the photodetector 30 are mounted on a substrate 1. The light source mainly outputting a TE mode may be a TE mode oscillation LD, which is one type of edge-emitting light source chip.

The optical wiring module of this embodiment may use the LD mainly outputting a TE mode, instead of the LD mainly outputting a TM mode. In this case, an axis of the half-wave plate 11 is disposed at 45° to the path of a TE mode wave emitted from the TE mode oscillation LD to convert the TE mode wave of the light source 10b into a TM mode wave which can be coupled to the metal optical waveguide 20.

FIG. 5 is a schematic view of an optical wiring module in accordance with a third exemplary embodiment of the present invention.

Referring to FIG. 5, the optical wiring module in accordance with a third exemplary embodiment of the present invention includes a light source 10b aligned to be rotated on a substrate by 90° and packaged thereon, and mainly outputting a TE mode, a metal optical waveguide 20 using LR-SPP, and a photodetector 30. The light source 10b, the metal optical waveguide 20, and the photodetector 30 are mounted on a substrate 1.

In this embodiment, the TE mode oscillation LD is aligned to be rotated by 90° and packaged on the substrate 1 during packaging, which includes alignment and mounting, and a flat surface of a metal wire of the LR-SPP metal optical waveguide 20 is aligned perpendicular to the LD chip, thereby making it possible to couple the light emitted from the TE mode oscillation LD to the metal optical wave guide 20 in a TM mode. According to this embodiment, it is possible to replace a TM mode oscillation LD with the light source of the optical wiring module.

FIG. 6 is a schematic view of an optical wiring module in accordance with a fourth exemplary embodiment of the present invention.

Referring to FIG. 6, the optical wiring module in accordance with a fourth exemplary embodiment of the present invention includes a light source 10b mounted on the surface of a substrate 1 and mainly outputting a TE mode, a metal optical waveguide 20 having a strip-shaped LR-SPP metal wire 22 mounted perpendicular to the surface of the substrate 1, and a photodetector 30.

In the optical wiring module of this embodiment, a TE mode LD chip is used in a general manner during packaging, which includes alignment and mounting, and a strip-shaped metal wire 22 having a rectangular cross-section in the metal optical waveguide 20 is deposited or plated perpendicular to the surface i.e., a flat main surface, of the substrate 1. Therefore, electromagnetic field components of the light emitted from the light source 10b, i.e., the incident wave, are coupled perpendicular to an interface of the metal optical waveguide 20, thereby exciting the LR-SPP in the metal wire 22 of the metal optical waveguide 20.

FIG. 7 is a schematic view of an optical wiring module in accordance with a fifth exemplary embodiment of the present invention.

Referring to FIG. 7, the optical wiring module in accordance with a fifth exemplary embodiment of the present invention includes a surface-emitting light source chip 10c perpendicularly mounted on a flat surface of a substrate, a metal optical waveguide 20 using LR-SPP, and a photodetector 30. The surface-emitting light source chip 10c, the metal optical waveguide 20, and the photodetector 30 are mounted on a substrate 1. The surface-emitting light source chip 10c includes a vertical-cavity surface-emitting laser (VCSEL).

In the optical wiring module of this embodiment, instead of using the edge-emitting LD chip, a TM mode obtained from the surface-emitting light source chip 10c vertically mounted on the substrate is used to excite the LR-SPP in the metal optical waveguide 20.

Instead of the conventional built-in optical fiber or dielectric optical waveguide, since the long-range surface plasmon polariton metal optical waveguide 20 is used for optical signal transmission, it is possible to simplify an optical waveguide process and increase yield. In addition, use of the metal optical waveguide 20 having a thickness on the order of nanometers and a width on the order of micrometers can be used to embody a compact and high-integration nano optical integrated circuit. Further, since the TM mode oscillation edge-emitting light source and the surface-emitting metal optical waveguide, as well as the vertical-cavity surface-emitting laser, are used, there is no need for 90° conversion alignment but only low-cost manual alignment. Further, since the thickness and width of the metal optical waveguide 20 can be considerably increased, it is possible to more readily align the optical wiring module.

In addition, by using the metal optical waveguide 20, it is possible to perform single mode transmission regardless of a mode size, without limitation of the distance and transmission speed. In other words, it is possible to solve the problem of restricted range and transmission speed when light is transmitted using the multi-mode optical waveguide, in comparison with single mode transmission, even though the multi-mode is used to enlarge the mode size for convenient alignment and other processes.

While a few exemplary embodiments of the present invention have been shown and described, it will be appreciated by those skilled in the art that various changes may be made to these embodiments without departing from the spirit and scope of the invention as defined by the appended claims and their equivalents.

The invention claimed is:

1. An optical wiring module comprising:
   a substrate;
   a light source on the substrate; and
   a metal optical waveguide on a same surface of the substrate as the light source and directly coupled within a pre-determined distance to a transverse magnetic mode of light emitted from the light source, and using a long-range surface plasmon polariton.

2. The optical wiring module according to claim 1, wherein the light source comprises an edge-emitting light source chip outputting the transverse magnetic mode.

3. The optical wiring module according to claim 1, wherein the light source comprises an edge-emitting light source chip outputting a transverse electric mode, and a half-wave plate for converting the transverse electric mode light emitted from the edge-emitting light source chip into the transverse magnetic mode light to transmit the transverse magnetic mode light to the metal optical waveguide.

4. The optical wiring module according to claim 1, wherein the light source comprises an edge-emitting light source chip outputting a transverse electric mode which is rotated by 90° and aligned on a substrate.

5. The optical wiring module according to claim 1, wherein the light source is an edge-emitting light source chip outputting a transverse electric mode, and the metal optical waveguide has a strip-shaped metal wire installed perpendicular to a flat surface of a substrate.

6. The optical wiring module according to claim 1, wherein the light source comprises a surface-emitting light source chip installed perpendicular to a surface of a substrate.

7. The optical wiring module according to claim 1, wherein the metal optical waveguide has a metal wire having a thickness of 5-200 nm and a width of 0.5-100 μm.

8. The optical wiring module according to claim 7, wherein the metal optical waveguide comprises a dielectric material layer in contact with the metal wire, and the dielectric layer comprises a low-loss polymer.

9. The optical wiring module according to claim 8, wherein the low-loss polymer comprises a polymer having a halogen element or deuterium.

10. The optical wiring module according to claim 1, wherein the metal optical waveguide has a metal wire formed of one of selected from the group consisting of gold, silver, copper, an alloy thereof, and a stack thereof.

11. The optical wiring module according to claim 1, further comprising a photodetector for receiving light transmitted through the metal optical waveguide.

* * * * *